J. R. FREEMAN.
WATER METER.
APPLICATION FILED MAY 8, 1905.

1,057,721.

Patented Apr. 1, 1913.
3 SHEETS—SHEET 1.

J. R. FREEMAN.
WATER METER.
APPLICATION FILED MAY 8, 1905.

1,057,721.

Patented Apr. 1, 1913.

J. R. FREEMAN.
WATER METER.
APPLICATION FILED MAY 8, 1905.

1,057,721.

Patented Apr. 1, 1913.

UNITED STATES PATENT OFFICE.

JOHN R. FREEMAN, OF PROVIDENCE, RHODE ISLAND.

WATER-METER.

1,057,721.  Specification of Letters Patent.  Patented Apr. 1, 1913.

Application filed May 8, 1905. Serial No. 259,346.

*To all whom it may concern:*

Be it known that I, JOHN R. FREEMAN, a citizen of the United States, residing at Providence, county of Providence, and State of Rhode Island, have invented an Improvement in Water-Meters, of which the following description, in connection with the accompanying drawing, is a specification, like letters on the drawings representing like parts.

This invention relates to that class of meters designed to measure the passage of small quantities of water through a main, and also, when required, to measure the passage of large flows up to the full capacity of the main, but without affording obstruction to the flow, such as would occur from the location of the mechanism of a meter within the main itself. Such a device finds its principal use in connection with a main on which dependence is had for furnishing water in the case of fire. In such case, under ordinary circumstances, the flow of the main is comparatively small, but it is desirable to measure the flow either for commercial purposes or to prevent surreptitious use of the water in small quantities. It is also desirable when the larger flow is required, as in the case of fire, to obtain as accurate a measurement as possible of the water thus used, but in that case, because of the necessity of having the flow as full and free as possible, the use of any measuring appliance which obstructs or retards the passage of the flow, or is liable to do so by getting out of order, must be avoided.

The present invention provides for a check-valve in the main which is closed until the larger flow, as in the case of fire, is required, and the ordinary small flow is drawn through a by-pass extending around the check-valve. This by-pass contains an ordinary meter which will measure all flow through the by-pass with all the accuracy obtainable by the meter. When the larger flow is called into play, as in the case of a fire, the loss of head causes the opening of the check-valve, and the large flow then takes place directly through the main and is measured by a device operating upon a principle somewhat similar to the general principle of the Venturi meter.

An important feature of the invention resides in the improvements which have been made in the means for measuring the flow of water through a pipe by a converging nozzle on the principle of the Venturi meter, whereby greater precision of measurement is secured.

The novel features of the invention will appear from the accompanying specification and drawings, and will be more particularly pointed out in the appended claims.

The drawing represents a meter showing a preferred form of the invention as designed for a fire supply service.

The meter is designed to be bolted in as a section of a water pipe or main, the usual flanges A and B by which the meter is thus bolted in position being shown. The meter is made up of sections of cast-iron or other metal bolted together in the usual manner, and the general construction shown in the drawings need not be further described.

The water enters the meter at the end having the flange A and passes into the Venturi nozzle C, then into the chamber D, slightly larger than the end of the nozzle, past the check-valve E and out through the opposite end of the meter having the flange B.

All small flows such as caused by any leakage of the piping system beyond the meter, or by any small surreptitious use, or by small commercial or other use, are provided for by the by-pass G, G, connecting the chamber H at the admission end of the meter with the chamber J at the eduction end. This by-pass is provided with any suitable form of metering device which will measure accurately the passage of the water through the by-pass G, G directly without excessive friction loss. This small measuring device or meter is indicated at K, and the mechanism thereof is not shown since such meters are common and well known. The so-called disk type of meter is preferable, because of its comparatively small friction loss while passing a given volume of water. The chamber H from which the by-pass G opens is separated from the rearward continuation of the Venturi nozzle through which the water enters the device, by a strainer L, which serves to prevent the passage of any foreign substance through the works of the meter K.

The check-valve E is carried by an arm E′, pivoted at $E^2$ to the casing above the passage or chamber D, so that when the check-valve opens it swings upwardly. It is desirable that while small quantities are being drawn the check-valve should remain closed and that the check-valve should oppose a definite resistance to the flow of the water, but when that resistance has been overcome by the loss of head resulting from the attempt to draw a large flow, that the check-valve should open readily to its uppermost position, leaving the main flow unobstructed and unretarded so far as possible. This result is secured by providing a lever $E^3$, pivoted at $E^4$ to the meter casing, and connected by a link $E^5$ with the check-valve E. This lever $E^3$ is provided with a weight $E^6$, movable thereon toward and from its pivot. In the form illustrated the weight is cylindrical and rolls freely back and forth toward and from the pivot on the lever $E^3$. When the check-valve is closed the lever $E^3$ slopes slightly downward toward the check-valve, so that the weight is furthest from the pivot and exerting the maximum pressure upon the check-valve to keep it closed. When the loss of head on the eduction side of the check-valve has become sufficient to cause the opening of the check-valve, it requires but a slight movement of the check-valve against the weight to bring the lever $E^3$ into a position sloping slightly downward toward its pivot, whereupon the movable weight moves toward the pivot $E^4$, reducing the pressure upon the check-valve until, when the check-valve is fully open the influence of the weight $E^6$ upon the check-valve causes comparatively little back pressure to interfere with the flow of the water.

While the shifting of the weight is a valuable and important feature, securing the results set forth above, it is obvious that valuable results may be secured without it, for when the check-valve is closing against the flow of water and the consequent pressure exerted thereby, the parts $E^3$ and $E^5$ are assuming their most nearly straight positions, thus exerting the maximum pressure tending to close the valve. On the other hand, in the opening of the check-valve, as soon as the valve begins to open, the force required to lift the weight on the toggle-lever rapidly diminishes, owing to the breaking of the toggle-joint, and the swinging of the check-valve more directly beneath the weight to be lifted. The quick opening of the check-valve after it has begun to open is further brought about by the shape of the valve itself which, as shown, is cup-shaped, being provided with a rim $e$ so that the water coming from the nozzle C impinges against it with greater force, and acts to throw it up and back to open position. The maximum lifting effect of the flow through the Venturi nozzle will, therefore, be exerted while the valve moves through a small arc of perhaps 5 degrees. The same object is further secured by providing a lip M in the chamber J extending over the eduction end of the by-pass G and directed toward the check-valve slightly above the orifice formed as the check-valve begins to open. In this construction as the check-valve opens the jet from its lower end will be caught by the projecting lip M over the discharge end of the by-pass G, and a pressure will thereupon be produced on this discharge orifice nearly as great as that existing at the admission end of the by-pass G. The by-pass will thereupon immediately discharge a much smaller volume of water than before, thereby concentrating most of the discharge through the Venturi nozzle. The object of the projecting lip M is, therefore, to concentrate the flow through the check-valve so soon as the check-valve begins to open and thus help open it to its fullest capacity, and at the same time bring the flow through the nozzle up to a velocity where the precision of measurement will be greater.

The flow actually taking place through the main pipe of the meter, that is, when the nozzle C, the chamber D, and the check-valve are open, is measured on the same general principle employed in the Venturi meter, but modified and improved to afford greater precision and efficiency of measurement. The ordinary method of obtaining the measurement is by measuring the difference between the pressure exerted at a point in the main pipe located above its contraction, as at the chamber P, and the pressure exerted in the main pipe at the point of its greatest contraction of area, as at the orifices $P^2$ connected with the chamber Q. Knowing the difference between these pressures and knowing the respective areas, the velocity of flow past the throat or the most contracted portion of the Venturi nozzle can be computed by well-known hydraulic laws, or the co-efficient of flow can be determined experimentally. The measurement can also be made by inserting a water meter in a pipe or by-pass connecting these orifices, that is, as illustrated in the drawing a pipe running from Q′ to P′. If a suitable type of meter is selected and the passages are of proper size and form the flow measured by this meter will be very nearly proportional to the square root of the difference in pressure at the two piezometric orifices P′ and Q′, and inasmuch as the volume flowing through the Venturi nozzle at the same time must be very nearly proportional also to the square root of the difference of pressure between the same points, the flow through the small meter in the by-pass connecting P′ and Q′ is at all times proportional to the flow through the main Venturi nozzle C. The ratio of the flow through the small by-pass to the flow through the Venturi nozzle can be determined experimentally and a rating obtained for any given meter, or in the device as herein described this ratio is so nearly the same as the ratio of the area of the small nozzle S, hereinafter described, to the area of the Venturi nozzle T that this latter ratio can be used directly with a degree of accuracy suitable for many purposes. It is to be noted also that in the device herein illustrated piezometric orifices at the throat T and at the entrance of the Venturi nozzle at V can be utilized by means of suitable gages, as by inserting such gages in the chambers Q and P to measure the flow through the said nozzle C under various experimental conditions, and by comparing the quantity thus determined with the readings of the small meter observed meanwhile, a rating can be obtained and the proportion or ratio by which the reading of the small meter O should be multiplied in order to learn the quantity passing through the Venturi nozzle.

An important feature of the present invention consists in the addition to or extension of the Venturi principle so as to obtain an aspirator or injector action in a chamber at the exit end of the nozzle, to which chamber the by-pass of the measuring device is connected, and whereby the pressure available for working the measuring device is materially increased. This result is secured in the construction illustrated in the drawing by forming the chamber D slightly larger in cross-section than the eduction orifice of the nozzle C, and providing a chamber R opening into the chamber D at the end of the nozzle C. The action of the flow from the end of the nozzle C through the chamber D will be similar to that occurring in the ordinary injector, tending to produce a vacuum in the chamber R and consequently materially increasing the pressure acting to produce a flow through the by-pass, connecting the chamber P with the chamber R, as indicated by the orifices P′ and R′. It is to be noted that the passageway outward from the end of the Venturi nozzle, or from the chamber D to the end of the meter shell at B, so far as the attachment of the check-valve E and the lip M will permit, enlarges in the direction of the flow, thereby increasing the suction-like action.

It is believed that connecting the downstream pressure gage or the outlet of the by-pass containing the measuring device or meter in the Venturi type of meter with an enlarged chamber into which the Venturi nozzle opens so as to get the aspirator or injector-like effect is broadly new.

Figure 1:
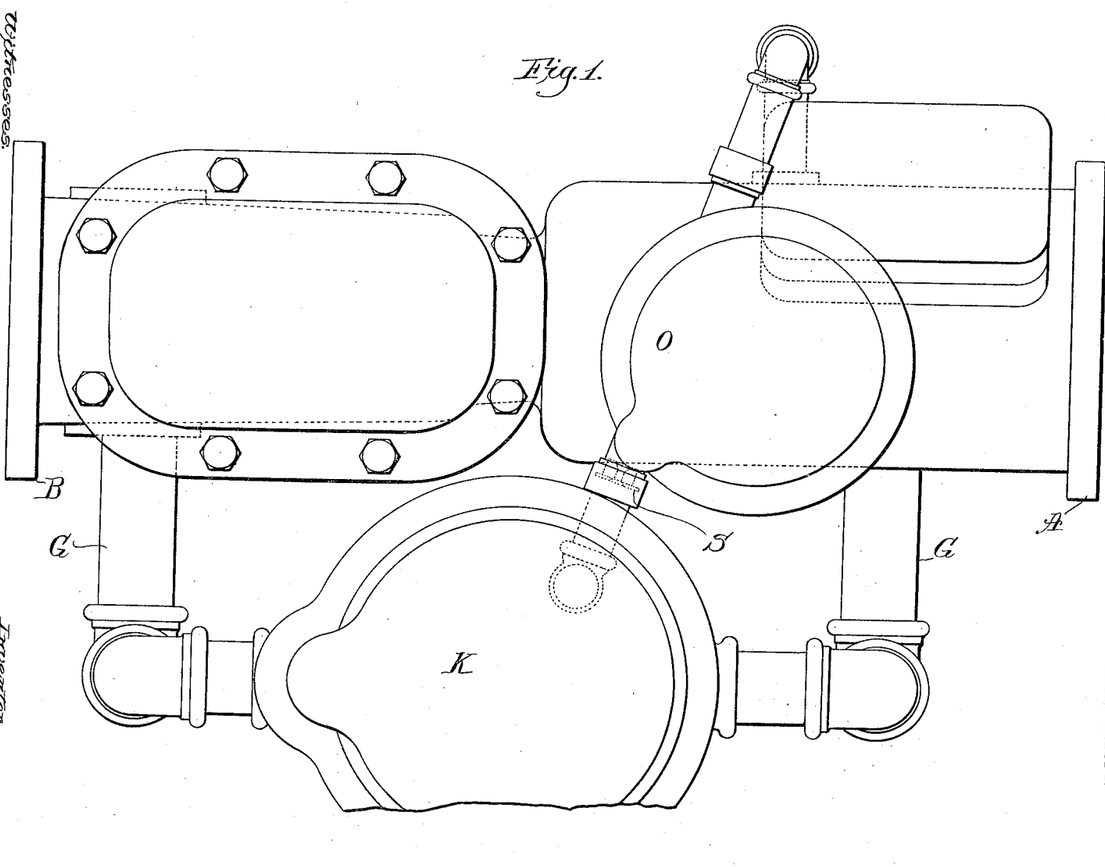
Figure 1 represents a top plan view of the meter.
Figure 2:
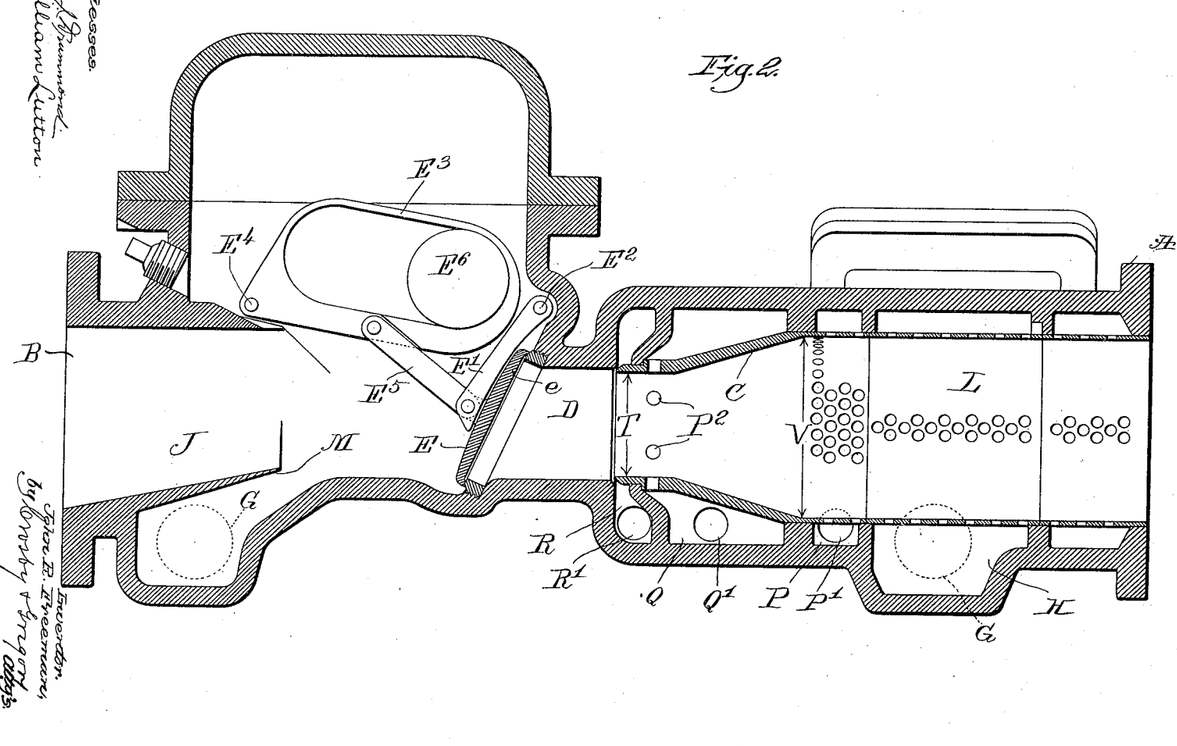
Fig. 2 a central, longitudinal, vertical cross-section thereof.
Figure 3:
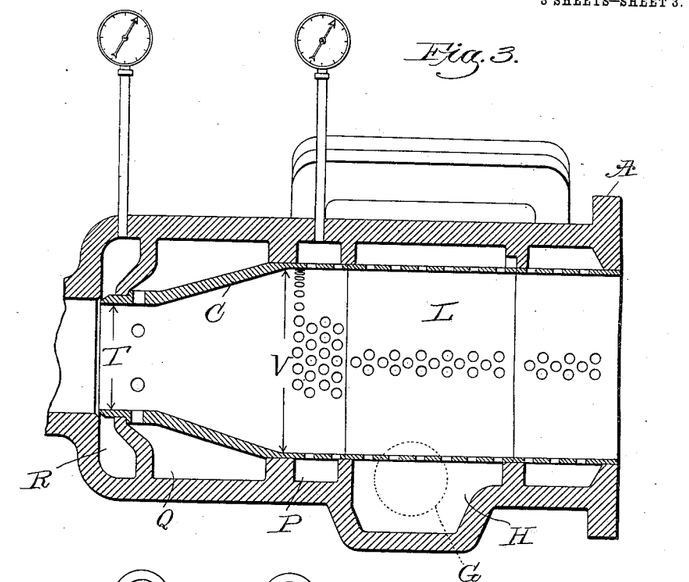
Fig. 3 is a similar section of a portion of the meter showing the use of pressure gages.
Figure 4:
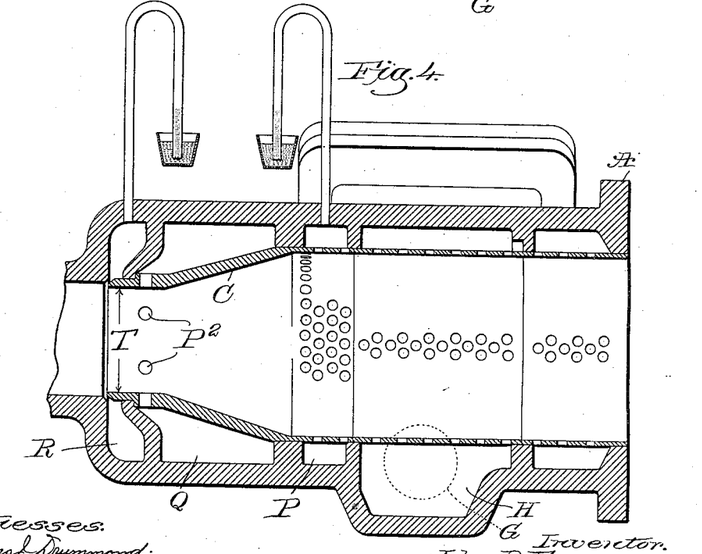
Fig. 4 is a similar section of a portion of the meter showing the use of piezometers.

Although in the drawing piezometric orifices through which the pressures in the main pipe with the large section V and the small section T respectively are transmitted to gage pipes or bypass, are shown as circumferential chambers, this form is not essential, the only thing necessary being a construction wherein connection may be made to an orifice at the section V and one at the section T. The result secured by the enlarged chamber into which the Venturi nozzle opens, whereby the aspirator or injector-like effect is secured, while of particular value in connection with the by-pass and measuring meter therein already described, is also valuable when the flow through the Venturi nozzle is determined by the use of pressure gages or piezometers. In such case piezometers are connected in the usual manner to an orifice connected one between the smaller end of the nozzle and the enlarged chamber, and the other at the larger end of the nozzle, or in the construction shown in the drawing at the chambers R and P. Such constructions are illustrated respectively in Figs. 3 and 4 of the drawings, Fig. 3 showing pressure gages, and Fig. 4 showing piezometers. This feature of the invention secures a greater difference of pressure at these two points, thus enabling the measurement of the flow to be obtained with greater precision.

A further important feature of the invention consists in providing means for restricting the area of the bypass at the Venturi nozzle to a desired definite proportion with the area of the main Venturi nozzle. This is accomplished by inserting a small nozzle, indicated at S, anywhere within the by-pass, either that portion supplying the meter O, or delivering therefrom. The relation of the area of the orifice in the nozzle S to the area of the orifice in the Venturi nozzle determines the proportion that the volume measured by the small meter bears to the flow through the Venturi nozzle. The improvement involved in the use of this nozzle S is that the ratio of area of nozzle S to that of the Venturi nozzle remains constant through an indefinite period, and the size of the nozzle S is the feature of the greatest resistance within the circuit containing the small or proportional meter O. This area of the nozzle S is made much smaller than the area of the pipes of the by-pass supplying the meter O, in order that the loss of pressure through the nozzle S may be relatively large in comparison with the friction loss in the pipes of the by-pass or in the meter O. Heretofore in proportional meters the pipes of the by-pass have been of the same nominal size as the small proportional meter, and the greatest point of resistance has been in the friction of the disk and connections forming a part of the metering device, with the result that any change in the friction of this disk or its attachments due to sediment, corrosion, etc., would change the relation in the flow through the meter O as compared with that through the Venturi nozzle. It is obvious that a meter acting on this general principle could be devised in which the reduction of area of the main pipe between V and T could be shaped otherwise than in the form of a smoothly tapering cone. The essential feature is that there should be a reduction of area and therefore an increase in mean velocity of the current, and consequently a loss of hydraulic head when a current flows from a section opposite the piezometer connected at the chamber P to a piezometer connected at the chamber Q.

It will be noted that in the meter herein described the small flows for ordinary commercial use take place through the main by-pass G, G which extends entirely around both the Venturi nozzle with its measuring appliances, and the check-valve. By this construction the measuring appliances of the Venturi meter are idle under ordinary circumstances, and until a large draft is required as for fire fighting purposes. Thus wear upon the meter or measuring appliances used with the Venturi nozzle is reduced to the minimum, and sediment, grass and other obstructions are prevented from being gradually drawn into the working parts thereof, thus securing a more accurate and sensitive device. Furthermore, the provision of the lip M results on the opening of the check-valve of a practical cessation of flow in the by-pass G, G, thus sending practically the entire flow through the Venturi nozzle, the measuring device of which will accordingly register practically the entire flow when the check-valve is open.

While the various features of the invention have been shown and described in its specific construction, it is obvious that the principle thereof can be applied in various ways, and that the invention in many of its features is of broad novelty.

Having described my invention, what I claim as new and desire to secure by Letters Patent, is:—

1. A water meter comprising a converging nozzle, a chamber slightly larger in diameter than the smaller end of said nozzle and into which the nozzle discharges, a piezometric by-pass connecting the upper end of said nozzle with said chamber, a measuring device located in said by-pass actuated by the flow therethrough, whereby the entire flow through the nozzle may be measured proportionally, a check valve below the chamber into which said nozzle discharges, an auxiliary by-pass around said nozzle and check valve, and means for measuring the flow through said auxiliary by-pass.

2. A water meter comprising a converging nozzle, a chamber slightly larger in diameter than the smaller end of said nozzle and into which the nozzle discharges, said chamber and the smaller end of said nozzle presenting a piezometric orifice therebetween, the upper end of said nozzle presenting a second piezometric orifice, a by-pass connecting said orifices, a measuring device in said by-pass actuated by the flow therethrough, whereby the entire flow through the nozzle may be measured proportionally, a check-valve below the chamber into which said nozzle discharges, an auxiliary by-pass around said nozzle and check-valve, and means for measuring the flow through said auxiliary by-pass.

3. A water meter comprising a converging nozzle, a chamber slightly larger in diameter than the smaller end of said nozzle and into which the nozzle discharges, a second chamber surrounding the smaller end of the converging nozzle and opening between the same and the first chamber, a by-pass around the converging nozzle connected with the second chamber, a measuring device in said by-pass actuated by the flow therethrough, whereby the entire flow through the nozzle may be measured proportionally, a check valve below the chamber into which said nozzle discharges, an auxiliary by-pass around said nozzle and check valve, and means for measuring the flow through said auxiliary by-pass.

4. A water meter comprising a large pipe, a small pipe, a converging nozzle having its larger end connected to the large pipe and its smaller end projecting into the small pipe, a chamber inclosing the opening between the nozzle and the small pipe, a by-pass connecting said chamber and the large pipe, a measuring device in said by-pass actuated by the flow therethrough, whereby the entire flow through the nozzle through the large pipe may be measured proportionally, a check valve below the chamber into which said nozzle discharges, an auxiliary by-pass around said nozzle and check valve, and means for measuring the flow through said auxiliary by-pass.

5. A water meter comprising a converging nozzle, a chamber slightly larger in diameter than the smaller end of said nozzle and into which the nozzle discharges, the passageway for the flow from said chamber increasing in area toward the eduction end of the water meter, a piezometric by-pass connecting the upper end of said nozzle with said chamber, a measuring device located in said by-pass actuated by the flow therethrough, whereby the entire flow through the nozzle may be measured proportionally, a check valve below the chamber into which said nozzle discharges, an auxiliary by-pass around said nozzle and check valve, and means for measuring the flow through said auxiliary by-pass.

6. A water meter comprising a converging nozzle, a chamber slightly larger in diameter than the smaller end of said nozzle and into which the nozzle discharges, the passageway for the flow from said chamber increasing in area toward the eduction end of the water meter, said chamber presenting a piezometric orifice near the smaller end of said nozzle, the upper end of said nozzle presenting a second piezometric orifice, a by-pass connecting said orifices, a measuring device in said by-pass actuated by the flow therethrough, whereby the entire flow through the nozzle may be measured proportionally, a check-valve below the chamber into which said nozzle discharges, an auxiliary by-pass around said nozzle and check-valve, and means for measuring the flow through said auxiliary by-pass.

7. A water meter comprising a converging nozzle, a chamber slightly larger in diameter than the smaller end of said nozzle and into which the nozzle discharges, said chamber presenting a piezometric orifice near the smaller end of said nozzle, the upper end of said nozzle presenting a second piezometric orifice, means connected with the said orifices and controlled by the difference in pressure for ascertaining the flow through the nozzle, a check-valve below the chamber into which said nozzle discharges, an auxiliary by-pass around said nozzle and check-valve, and means for measuring the flow through said auxiliary by-pass.

8. A water meter comprising a main pipe, a check-valve therein, a by-pass around said check-valve, means for measuring the flow through the by-pass, a lip extending over the eduction port of the by-pass and directed toward and above the initial opening of the check-valve, whereby upon the initial opening of the check-valve the initial flow through the main pipe is directed into the eduction port of the by-pass.

9. A water meter comprising a main pipe, a check-valve therein, a by-pass around said check-valve, means for measuring the flow through the by-pass, a lip extending over the eduction port of the by-pass and directed toward and above the initial opening of the check-valve, whereby upon the initial opening of the check-valve the initial flow through the main pipe is directed into the eduction port of the by-pass, and means for measuring the flow through the main pipe.

10. A water meter comprising a main pipe, a check-valve pivotally mounted therein to swing upwardly, a by-pass around said check-valve, means for measuring the flow through the by-pass, a lip extending over the eduction port of the by-pass and directed to receive below it the flow in the main pipe passing through the check-valve upon the initial opening thereof, whereby the initial flow through the main pipe is directed into the eduction port of the by-pass.

11. A water meter comprising a main pipe, a gaging nozzle therein, a by-pass around said gaging nozzle, a measuring device located in said by-pass, said by-pass presenting at one point a contracted area causing a loss of head much larger than the loss of head caused by said measuring device.

12. A water meter comprising a main pipe, a gaging nozzle therein, a by-pass around said gaging nozzle, a measuring device located in said by-pass, a contracting nozzle located in said by-pass and presenting an orifice causing a loss of head much larger than the loss of head caused by said measuring device.

13. A water meter comprising a main pipe, a Venturi nozzle therein, means for measuring the flow through the Venturi nozzle, a check-valve below the Venturi nozzle, an auxiliary by-pass around the Venturi nozzle and check-valve, means for measuring the flow through the auxiliary by-pass.

14. A water meter comprising a main pipe, a Venturi nozzle therein, a piezometric by-pass around said Venturi nozzle, means located in said by-pass actuated by the flow therethrough for determining the flow through the main pipe, a check-valve below the Venturi nozzle, an auxiliary by-pass around the Venturi nozzle and check-valve, means for measuring the flow through the auxiliary by-pass.

15. A water meter comprising a main pipe, a Venturi nozzle therein, means for measuring the flow through the Venturi nozzle, a check-valve below the Venturi nozzle, an auxiliary by-pass around the Venturi nozzle and check-valve, means for measuring the flow through the auxiliary by-pass, a lip extending over the eduction port of said auxiliary by-pass and directed toward and above the initial opening of the check-valve, whereby upon the opening of the check-valve the flow through the auxiliary by-pass becomes inconsiderable.

16. A water meter comprising a main pipe, a Venturi nozzle therein, a chamber slightly larger in diameter than the smaller end of said nozzle and into which the nozzle discharges, said chamber and the smaller end of said nozzle presenting therebetween a piezometric orifice, the upper end of said nozzle presenting a second piezometric orifice, a by-pass connecting said orifices, a measuring device in said by-pass actuated by the flow therethrough, a check-valve below said chamber, an auxiliary by-pass around the Venturi nozzle and check-valve, and means for measuring the flow through the auxiliary by-pass.

17. A water meter comprising a main pipe, a Venturi nozzle therein, a chamber slightly larger in diameter than the smaller end of said nozzle and into which the nozzle discharges, the smaller end of said nozzle and said chamber presenting therebetween a piezometric orifice, the upper end of said nozzle presenting a second piezometric orifice, a by-pass connecting said orifices, a measuring device in said by-pass actuated by the flow therethrough, a check-valve below said chamber, an auxiliary by-pass around the Venturi nozzle and check-valve, means for measuring the flow through the auxiliary by-pass, a lip extending over the eduction port of said auxiliary by-pass and directed toward and above the initial opening of the check-valve, whereby upon the opening of the check-valve the flow through the auxiliary by-pass becomes inconsiderable.

18. A water meter comprising a main pipe, a contracted area in said pipe, means for measuring the flow through said pipe by the loss of head caused at said contracted area, a check-valve in the main pipe below said contracted area, an auxiliary by-pass around said contracted area and check-valve, means for measuring the flow through the auxiliary by-pass.

19. A water meter comprising a main pipe, a contracted area in said pipe, means for measuring the flow through said pipe by the loss of head caused at said contracted area, a check-valve below said contracted area, an auxiliary by-pass around said check-valve and contracted area, means for measuring the flow through the auxiliary by-pass, a lip extending over the eduction port of said auxiliary by-pass and directed toward and above the initial opening of the check-valve, whereby upon the opening of the check-valve the flow through the auxiliary by-pass becomes inconsiderable.

20. A water meter comprising a main pipe, a contracted area in said pipe, said pipe presenting piezometric orifices above and below said contracted area, a by-pass connecting said orifices, means located in said by-pass actuated by the flow therethrough for determining the flow through the main pipe, a check-valve below said contracted area, an auxiliary by-pass around said contracted area and check-valve, means for measuring the flow through the auxiliary by-pass.

21. A water meter comprising two water measuring passageways, the first provided with means for the accurate measurement of small rates of flow, the second adapted for large rates of flow, and provided with means for measuring the same proportionally and with small loss of head, a pivotally mounted check-valve for said second passageway, a shiftable weight mounted to act on said valve, means for shifting said weight immediately upon the initial opening of the valve to reduce the pressure thereof upon the valve.

22. A water meter comprising two water measuring passageways, the first provided with means for the accurate measurement of small rates of flow, the second adapted for large rates of flow, and provided with means for measuring the same proportionally and with small loss of head, a pivotally-mounted check-valve for said second passageway, a lever carrying a shiftable weight and connected with said valve and so arranged that upon the initial opening of the valve the weight will automatically shift along said lever to reduce the pressure acting to close the valve.

23. A water meter comprising two water measuring passageways, the first provided with means for the accurate measurement of small rates of flow, the second adapted for large rates of flow, and provided with means for measuring the same proportionally and with small loss of head, a pivotally mounted check-valve for said second passageway, a lever pivoted to the meter casing, a link connecting said lever and said valve, a weight shiftable along said lever and so arranged that when the valve is closed the weight exerts its maximum pressure upon the valve, but upon the initial opening of the valve the lever rocks and the weight is shifted to exert its minimum pressure on the valve.

24. A water meter comprising two water measuring passageways, the first provided with means for the accurate measurement of small rates of flow, the second adapted for large rates of flow, and provided with means for measuring the same proportionally and with small loss of head, a check-valve for said second passageway, a toggle-joint lever connected at one end to said check-valve and at the other end to the meter casing, a shiftable weight connected with said toggle-joint lever and acting to close said check-valve, the shifting weight exerting its maximum effect at the closing of the check-valve and shifting immediately after the check-valve begins to open to exert its minimum closing effect.

25. A water meter comprising two water measuring passageways, the first provided with means for the accurate measurement of small rates of flow, the second adapted for large rates of flow, and provided with means for measuring the same proportionally and with small loss of head, a pivotally mounted check-valve for said second passageway, a toggle-joint lever connected at one end to said check-valve and at the other end to the meter casing, a shiftable weight connected with said toggle-joint lever and acting to close said check-valve, the shifting weight exerting its maximum effect at the closing of the check-valve and shifting immediately after the check-valve begins to open to exert its minimum closing effect.

26. A water meter comprising two water measuring passageways, the first provided with means for the accurate measurement of small rates of flow, the second adapted for large rates of flow, and provided with means for measuring the same proportionally and with small loss of head, a check-valve for said second passageway, a toggle-joint lever connected at one end to said check-valve and at the other end to the casing, a shiftable weight connected with said toggle-joint lever, means including said lever for shifting the weight upon the closing movement of the valve to cause it to produce its maximum effect in the closing thrust of the toggle-joint lever and for shifting the weight immediately upon the opening of the check-valve to lessen rapidly its pressure upon the valve.

27. A water meter comprising two water measuring passageways, the first provided with means for the accurate measurement of small rates of flow, the second adapted for large rates of flow, and provided with means for measuring the same proportionally and with small loss of head, a pivotally mounted check-valve for said second passageway, a toggle-joint lever connected at one end to said check-valve and at the other end to the casing, a shiftable weight connected with said toggle-joint lever, means including said lever for shifting the weight upon the closing movement of the valve to cause it to produce its maximum effect in the closing thrust of the toggle-joint lever and for shifting the weight immediately upon the opening of the check-valve to lessen rapidly its pressure upon the valve.

28. A water meter comprising two water measuring passageways, the first provided with means for the accurate measurement of small rates of flow, the second adapted for large rates of flow, and provided with means for measuring the same proportionally and with small loss of head, a check-valve for said second passageway, a toggle-joint lever connected at one end to said check-valve and at the other end to the casing, a weight supported by said toggle-joint lever, whereby the maximum effect of the weight is produced in the final closing movement of the valve, and whereby upon the opening of the valve the force required to lift the weight rapidly decreases.

29. A water meter comprising two water measuring passageways, the first provided with means for the accurate measurement of small rates of flow, and the second adapted for large rates of flow, and provided with means for measuring the same proportionally and with small loss of head, a pivotally mounted check-valve for said second passageway, a toggle-joint lever connected at one end to said check-valve and at the other end to the casing, a weight supported by said toggle-joint lever, whereby the maximum effect of the weight is produced in the final closing movement of the valve, and whereby upon the opening of the valve the force required to lift the weight rapidly decreases.

30. A water meter comprising two water measuring passageways, the first provided with means for the accurate measurement of small rates of flow, the second comprising a converging nozzle and adapted for large rates of flow, and provided with means for measuring the flow through the converging nozzle proportionally and with small loss of head, a pivotally mounted check-valve for said second passageway, a shiftable weight mounted to act on said valve, means for shifting said weight immediately upon the initial opening of the valve to reduce the pressure thereof upon the valve.

31. A water meter comprising two water measuring passageways, the first provided with means for the accurate measurement of small rates of flow, the second comprising a converging nozzle and adapted for large rates of flow, and provided with means for measuring the flow through the converging nozzle proportionally and with small loss of head, a pivotally mounted check-valve for said second passageway, a lever carrying a shiftable weight connected with said valve and so arranged that upon the initial opening of the valve the weight will automatically shift along said lever to reduce the pressure acting to close the valve.

32. A water meter comprising two water measuring passageways, the first provided with means for the accurate measurement of small rates of flow, the second comprising a converging nozzle and adapted for large rates of flow, and provided with means for measuring the flow through the converging nozzle proportionally and with small loss of head, a pivotally mounted check-valve for said second passageway, a lever pivoted to the meter casing, a link connecting said lever and said valve, a weight shiftable along said lever and so arranged that when the valve is closed the weight exerts its maximum pressure upon the valve, but upon the initial opening of the valve the lever rocks and the weight is shifted to exert its minimum pressure on the valve.

33. A water meter comprising two water measuring passageways, the first provided with means for the accurate measurement of small rates of flow, the second comprising a converging nozzle and adapted for large rates of flow, and provided with means for measuring the flow through the converging nozzle proportionally and with small loss of head, a check-valve for said second passageway, a toggle-joint lever connected at one end to said check-valve and at the other end to the meter casing, a shiftable weight connected with said toggle-joint lever and acting to close said check-valve, the shifting weight exerting its maximum effect at the closing of the check-valve and shifting immediately after the check-valve begins to open to exert its minimum closing effect.

34. A water meter comprising two water measuring passageways, the first provided with means for the accurate measurement of small rates of flow, the second comprising a converging nozzle and adapted for large rates of flow, and provided with means for measuring the flow through the converging nozzle proportionally and with small loss of head, a pivotally mounted check-valve for said second passageway, a toggle-joint lever connected at one end to said check-valve and at the other end to the meter casing, a shiftable weight connected with said toggle-joint lever and acting to close said check-valve, the shifting weight exerting its maximum effect at the closing of the check-valve and shifting immediately after the check-valve begins to open to exert its minimum closing effect.

35. A water meter comprising two water measuring passageways, the first provided with means for the accurate measurement of small rates of flow, the second comprising a converging nozzle and adapted for large rates of flow, and provided with means for measuring the flow through the converging nozzle proportionally and with small loss of head, a check-valve for said second passageway, a toggle-joint lever connected at one end to said check-valve and at the other end to the casing, a shiftable weight connected with said toggle-joint lever, means including said lever for shifting the weight upon the closing movement of the valve to cause it to produce its maximum effect in the closing thrust of the toggle-joint lever and for shifting the weight immediately upon the opening of the check-valve to lessen rapidly its pressure upon the valve.

36. A water meter comprising two water measuring passageways, the first provided with means for the accurate measurement of small rates of flow, the second comprising a converging nozzle and adapted for large rates of flow, and provided with means for measuring the flow through the converging nozzle proportionally and with small loss of head, a pivotally mounted check-valve for said second passageway, a toggle-joint lever connected at one end to said check-valve and at the other end to the casing, a shiftable weight connected with said toggle-joint lever, means including said lever for shifting the weight upon the closing movement of the valve to cause it to produce its maximum effect in the closing thrust of the toggle-joint lever and for shifting the weight immediately upon the opening of the check-valve to lessen rapidly its pressure upon the valve.

37. A water meter comprising two water measuring passageways, the first provided with means for the accurate measurement of small rates of flow, the second comprising a converging nozzle and adapted for large rates of flow, and provided with means for measuring the flow through the converging nozzle proportionally and with small loss of head, a check-valve for said second passageway, a toggle-joint lever connected at one end to said check-valve and at the other end to the casing, a weight supported by said toggle-joint lever, whereby the maximum effect of the weight is produced in the final closing movement of the valve, and whereby upon the opening of the valve the force required to lift the weight rapidly decreases.

38. A water meter comprising two water measuring passageways, the first provided with means for the accurate measurement of small rates of flow, the second comprising a converging nozzle and adapted for large rates of flow, and provided with means for measuring the flow through the converging nozzle proportionally and with small loss of head, a pivotally mounted check-valve for said second passageway, a toggle-joint lever connected at one end to said check-valve and at the other end to the casing, a weight supported by said toggle-joint lever, whereby the maximum effect of the weight is produced in the final closing movement of the valve, and whereby upon the opening of the valve the force required to lift the weight rapidly decreases.

39. A water meter comprising two water measuring passageways, the first provided with means for the accurate measurement of small rates of flow, the second adapted for large rates of flow, and provided with means for measuring the same proportionally and with small loss of head, a pivotally mounted check valve for said second passageway, a shiftable weight mounted to act on said valve, means whereby said weight is shifted so as to act with greatest force upon the valve at and near its closed position.

40. A water meter comprising two water measuring passageways, the first provided with means for the accurate measurement of small rates of flow, the second comprising a converging nozzle and adapted for large rates of flow, and provided with means for measuring the flow through the converging nozzle proportionally and with small loss of head, a pivotally mounted check valve for said second passageway, a shiftable weight mounted to act on said valve, means whereby said weight is shifted so as to act with greatest force upon the valve at and near its closed position.

41. In combination with a meter system, means for controlling the flow through said system including a valve, a shiftable weight, and means by which said weight is shifted with respect to the valve by a change in position of said valve occasioned by a decrease in flow through said system so as to operate the valve to cut off the unrestricted flow through said system.

In testimony whereof, I have signed my name to this specification, in the presence of two subscribing witnesses.

JOHN R. FREEMAN.

Witnesses:
NATHAN HEARD,
MABEL PARTELOW.